Patented Feb. 9, 1937

2,070,524

UNITED STATES PATENT OFFICE 2,070,524

ACCELERATOR OF VULCANIZATION

Howard I. Cramer, Cuyahoga Falls, Ohio, assignor to Wingfoot Corporation, Wilmington, Del., a corporation of Delaware No Drawing. Application November 1, 1934
Serial No. 751,036

11 Claims. (Cl. 18—53)

This invention relates to the process of accelerating the vulcanization of rubber and to the rubber products produced thereby. It is particularly directed to the use of a new class of accelerators of vulcanization; namely, the amines containing at least one tetrahydro furane ring. The compounds in question are not only good accelerators but also impart valuable physical characteristics to the vulcanized product and may be easily incorporated in the rubber.

The tetrahydro furane ring amines of the invention are generally the most easily prepared by hydrogenation processes and are those amines in which the double bonds of the furane ring are saturated. The tetrahydro furfuryl amines are the preferred class of amines of the invention.

The tetrahydro furane ring amines may be represented by the general formula

wherein R is a group containing a tetrahydro furane ring, such as, for example, the tetrahydro alpha furfuryl group; and R' and R'' are monovalent radicals such as hydrogen or alkyl, alicyclic, furyl, furfuryl, tetrahydro furyl, tetrahydro furfuryl, beta tetrahydro furyl ethyl or aralkyl groups. Also, R' and R'' may together represent an alkylene chain which may, if desired, be interrupted by an oxygen or sulphur atom. While the primary and secondary amines of this type are preferable, it will be understood that the more basic tertiary amines, such as, for example, N-N-diethyl tetrahydro alpha furfuryl amine and N-N-dimethyl tetrahydro alpha furfuryl amine, are also accelerators of vulcanization. In general, any amine containing a tetrahydro furane ring in which aliphatic characteristics predominate may be employed in the practice of the invention. A more specific formula representing a preferred class of the tetrahydro furane ring amines is the following:

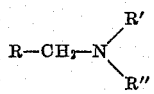

wherein the R's represent the same groups expressed above.

Illustrative of the tetrahydro furane ring amines are the primary amines such as tetrahydro alpha furyl amine, tetrahydro beta furyl amine, tetrahydro alpha furfuryl amine and tetrahydro beta furfuryl amine. Examples of secondary and tertiary amines are di tetrahydro alpha- and beta-furfuryl amines, N-tetrahydro alpha furfuryl alpha furfuryl amine, N-ethyl tetrahydro alpha- and beta-furfuryl amines, N-cyclohexyl tetrahydro alpha- and beta-furfuryl amines, N-benzyl tetrahydro alpha- and beta-furfuryl amines, N-tetrahydro alpha- and beta-furfuryl piperidines, di tetrahydro alpha- and beta-furyl amines, di (2-tetrahydro, alpha or beta, furyl ethyl) amines, N-morpholyl tetrahydro alpha furfuryl amaine, N-methyl tetrahydro alpha furfuryl amine, N-ethyl tetrahydro alpha furyl amine, N-isobutyl tetrahydro alpha furfuryl amine, N-isoamyl tetrahydro alpha furfuryl amine, N-n-butyl tetrahydro alpha furfuryl amine, N-beta phenyl ethylene tetrahydro alpha furfuryl amine, and the N-hexahydro tolyl tetrahydro alpha and beta- furfuryl amines. Others are tri tetrahydro alpha- and beta- furfuryl amines, N-N-di iso propyl tetrahydro alpha furfuryl amine, and amyl tetrahydro alpha furfuryl amine. Still others are tri tetrahydro alpha- and beta-furyl amines, N-iso propyl tetrahydro alpha- and beta-furyl amines and 2-tetrahydro, alpha- or beta-, furyl ethyl amines.

Illustrative of the preparation of the compounds of the invention is the process disclosed in U. S. Patents No. 2,045,574, granted June 30, 1936 to Adkins and Winans and No. 2,047,926 granted July 14, 1936 to Cramer in which approximately 115 grams of hydro furamide, melting point 120–121° C., dissolved in 200 ml. ethanol were hydrogenated over 11 grams of a nickel catalyst for two hours at a temperature of about 100° C. and under a pressure of 70–110 atmospheres. The product, on fractional distillation, gave a 92% yield of tetrahydro alpha furfuryl amine, boiling point 50–52° C. at 735 mm. pressure, and a 92% yield of di alpha furfuryl amine, boiling point 103–106° C. at 2–3 mm. Upon segregating these two products and separately hydrogenating the di alpha furfuryl amine, ditetrahydro alpha furfuryl amine, a water-white liquid boiling at 150–155° C. at 30 mm., was obtained in a substantially quantitative yield.

Further illustrative, compounds such as N-ethyl and N-cyclohexyl tetrahydro alpha- and beta-furfuryl amines may be prepared by (1) condensing the corresponding tetrahydro furfuryl alcohol with ethyl or cyclohexyl amine over a nickel catalyst at a temperature in the neighborhood of 200° C. or by condensing under similar conditions the tetrahydro furfuryl amine with ethanol or cyclohexanol; (2) by the simultaneous hydrogenation and alkylation of a mixture of tetrahydro furaldehyde with ethyl amine or cyclohexyl amine over a nickel catalyst at 100–150° C. or by a similar process starting with the tetrahydro furfuryl amine and acet aldehyde or cyclohexanone. Other compounds of the class may, of course, be prepared similarly.

Conveniently any of these new accelerators or a mixture thereof may be added to any of the ordinary rubber mixes in an amount which may be determined according to the usual methods. Exemplary of a rubber formula in which the compounds of the invention have been found to be effective is the following:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

Samples of the compounded rubber made up in accordance with this formula were subjected to vulcanization by steam heat in a mold after which they were tested for elasticity and tensile strength.

| Cure in mins. @ ° F. | Ult. tensile in kgs./cm.$^2$ | Max. elong. in percent | Modulus in kgs./cm.$^2$ | |
|---|---|---|---|---|
| | | | 500% | 700% |
| Mono tetrahydro alpha furfuryl amine | | | | |
| 20/260 | 52 | 950 | 7 | 16 |
| 40 | 90 | 865 | 12 | 37 |
| 60 | 120 | 840 | 16 | 53 |
| 80 | 132 | 820 | 19 | 67 |
| Di tetrahydro alpha furfuryl amine | | | | |
| 40/260 | 38 | 920 | 7 | 14 |
| 60 | 76 | 910 | 10 | 25 |
| 80 | 80 | 890 | 11 | 28 |
| 120 | 108 | 860 | 15 | 45 |

It will be understood that by the term "rubber" is meant any of the ordinary forms of rubber such as latex, reclaimed rubber and the ordinary coagulated forms of the *Hevea brasiliensis* tree. It is intended that the patent shall cover, by suitable expression in the appended claims, whatever features of patentable novelty reside in the invention.

What I claim is:

1. The process of treating rubber which comprises subjecting it to vulcanization in the presence of tetrahydro alpha furfuryl amine.
2. The process of treating rubber which comprises subjecting it to vulcanization in the presence of a primary tetrahydro furfuryl amine.
3. The process of treating rubber which comprises subjecting it to vulcanization in the presence of di(tetrahydro alpha furfuryl) amine.
4. The process of treating rubber which comprises subjecting it to vulcanization in the presence of a secondary N-saturated hydrocarbon N-tetra alpha furfuryl amine.
5. A rubber product which has been vulcanized in the presence of di(tetrahydro alpha furfuryl) amine.
6. A rubber product which has been vulcanized in the presence of tetrahydro alpha furfuryl amine.
7. A rubber product which has been vulcanized in the presence of a primary tetrahydro furfuryl amine.
8. A rubber product which has been vulcanized in the presence of an amine of the formula

wherein R is a radical selected from the group consisting of tetrahydro furyl, tetrahydro furfuryl, and beta tetrahydro furyl ethyl radicals, and R' and R'' are hydrogen, alkyl, alicyclic, furyl, furfuryl, tetrahydro furyl, tetrahydro furfuryl, beta tetrahydro furyl ethyl or aralkyl groups or R' and R'' are together an alkylene chain which may be interrupted by an oxygen or sulphur atom.

9. The process of producing vulcanized rubber which comprises heating rubber and sulphur in the presence of an amine of the formula

wherein R is a radical selected from the group consisting of tetrahydro furyl, tetrahydro furfuryl, and beta tetrahydro furyl ethyl radicals, and R' and R'' are hydrogen, alkyl alicyclic, furyl, furfuryl, tetrahydro furyl, tetrahydro furyl, beta tetrahydro furyl ethyl or aralkyl groups or R' and R'' are together an alkylene chain which may be interrupted by an oxygen or sulphur atom.

10. A process of producing vulcanized rubber which comprises heating rubber in sulphur in the presence of an amine having the formula

wherein R is a tetrahydro furfuryl radical, R' is hydrogen and R'' is a saturated hydrocarbon radical.

11. A rubber product that has been vulcanized in the presence of an amine having the formula

wherein R is a tetrahydrofurfuryl radical, R' is hydrogen and R'' is a saturated hydrocarbon radical.

HOWARD I. CRAMER.